Aug. 11, 1964  J. J. BREITHAUPT  3,144,646
DOPPLER SYSTEM
Filed July 8, 1959  6 Sheets-Sheet 3

INVENTOR
Joe J. Breithaupt
BY Stevens, Davis, Miller & Mosher
ATTORNEYS

Aug. 11, 1964     J. J. BREITHAUPT     3,144,646
DOPPLER SYSTEM

Filed July 8, 1959                           6 Sheets-Sheet 5

INVENTOR
Joe J. Breithaupt

BY Stevens, Davis, Miller & Mosher
ATTORNEYS

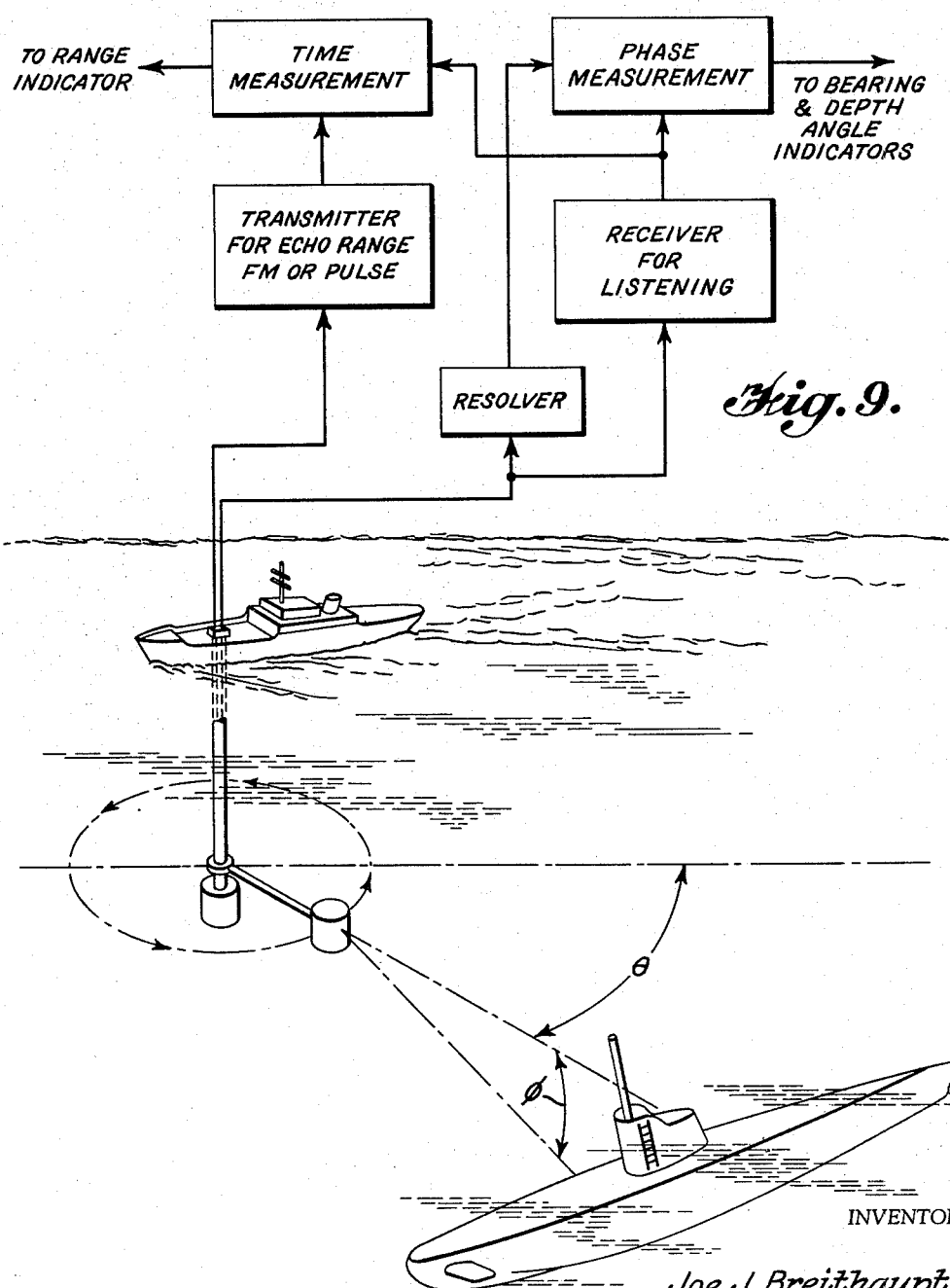

United States Patent Office 3,144,646
Patented Aug. 11, 1964

3,144,646
DOPPLER SYSTEM
Joe J. Breithaupt, Irving, Tex., assignor to Texas Instruments Incorporated, Dallas, Tex., a corporation of Delaware
Filed July 8, 1959, Ser. No. 825,695
17 Claims. (Cl. 343—16)

This invention relates to radar and sonar and more particularly relates to a system which advantageously employs the doppler phenomena whereby radiant energy traveling between a source and a target having relative velocity with respect to each other undergoes frequency modulation due to the relative motion.

The present invention uses the doppler effect to obtain doppler modulation on a radar signal by revolving the signal-radiating or receiving antenna with sufficient radius and at sufficient velocity to produce a measurable doppler frequency modulation so that target bearing and elevation may be determined. Also, the doppler effect is used to obtain a shift in the received wave as compared to the outgoing wave to produce a difference frequency for determining target range and velocity.

By radiating a frequency modulated signal from a revolving radar antenna to obtain the doppler modulation described above, a radar system can be provided which obtains information as to the range of a target, the relative velocity between the radar and the target, the azimuthal angle of the target and the elevational angle of the target, all from a single modulated wave. A radar system constructed according to this principle could be installed on the ground near an airport for air traffic surveillance and to give bearing and elevational information to approaching aircraft so that they can make instrument landings.

In addition, the radar could be placed in aircraft to obtain air collision avoidance information. In such application, the propeller of a conventional airplane or the blade of a helicopter can be used as the radiating antenna, and not only could the aircraft possessing such radiating equipment determine its own position, but it could serve as a beacon station for aircraft having receiving equipment only. The receiver in the non-beacon plane would be able to determine the bearing to the transmitting aircraft as well as the elevational angle between the two aircraft.

Another use for the system is in missile guidance, where a revolving antenna can be placed in the nose cone of the missile to be controlled or tracked. Both active and passive systems may be provided in such instances.

The principles of this invention not only apply to the radiation of electromagnetic energy but also apply to acoustical energy. In the acoustic case, the transducer is revolved either in water or in some other conducting medium. The acoustic system has application in anti-submarine warfare systems and sonic torpedo guidance as well as in geophysical survey work. For the latter, a suitable liquid coupling would be supplied between the earth to be explored and the electric-acoustic transducer. The transducer would then be moved in a circle to produce the doppler bearing and angle information.

In accordance with the radar objectives and applications outlined above, a signal indicative of bearing, elevation, range and relative velocity is produced according to the principles of the present invention as follows. A radio frequency carrier signal is frequency modulated by a sawtooth voltage and is radiated by an antenna which is revolving in a plane at constant angular velocity. The radiated wave, after striking a target and returning to the antenna, is sent to a receiver where the instantaneous frequency of the received wave is compared with that of the outgoing wave. The difference frequency is an indication of the travel time to the target and back, hence the range to the target. Relative velocity is determined by measuring the range rate of change. The radiated wave undergoes frequency modulation due to the doppler effect of the revolving antenna. The received reflected signal is demodulated, and the phase relation between a reference signal and the demodulated reflected signal is determined. This phase difference is proportional to the bearing or azimuthal angle of the target. The amplitude of the demodulated reflected signal is also measured and is proportional to the elevational angle of the target above the plane of the revolving antenna. Thus it is possible to read range to the target, relative velocity between the target and the radiator, the azimuthal angle of the target, and its elevational angle from the single reflected wave.

Additional objects, advantages and characteristic features of the present invention will become readily apparent from the following detailed description of preferred embodiments when taken in conjunction with the appended drawings in which:

FIGURE 9 illustrates a sonar system employing the principles of the invention as applied to anti-submarine warfare and to geophysical surveying; and FIGURE 10 illustrates a further embodiment of the present invention.

Figure 1:
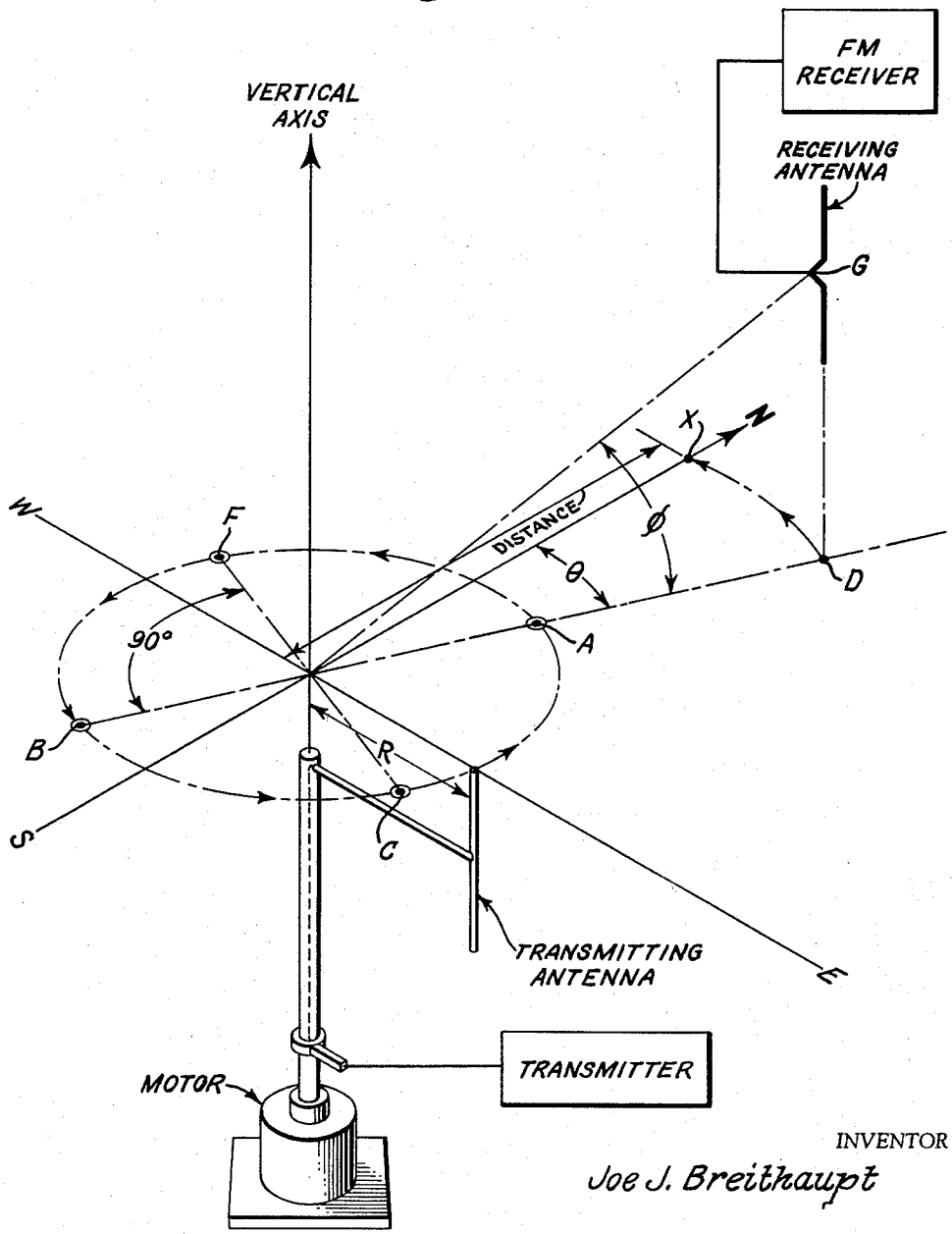
FIGURE 1 is a diagram illustrating on a three dimensional graph some of the doppler theory used in the present invention.

Before proceeding with the detailed description of the apparatus of the invention, some of the doppler theory necessary for an understanding of the operation of the radar system will be briefly discussed. Referring to FIGURE 1, a three dimensional Cartesian coordinate system is shown having a vertical axis as well as East-West and North-South horizontal axes (the North-South and East-West designations being merely for convenience). A transmitting antenna is located at a radius R from the origin and is revolved about the origin with velocity V in the horizontal plane. (Throughout the theoretical explanation, it will be assumed that a constant frequency signal is fed to the antenna from the transmitter.) Assume for the moment, that the receiving antenna is located at point X (in the North-South, East-West plane and in the N-direction). A dopper effect, i.e. a shift in the frequency of the wave received by a stationary receiver, is produced due to the movement of the antenna. With the receiving antenna at point X, a maximum positive doppler frequency shift is produced when the transmitting antenna is at point E, a maximum negative doppler frequency shift is obtained when the transmitting antenna is at point W, and no doppler effect (i.e. an unmodulated signal is received) when the revolving antenna is at points N or S. Thus, a frequency modulated signal is received at point X, the maximum frequency coming when the transmitter is at point E and the minimum frequency coming when the transmitter is at point W.

When the receiver in FIGURE 1 is moved to point D which has the bearing or azimuthal angle θ relative to North but is still in the North-South, East-West plane, the maximum frequency is obtained when the transmitting antenna is at C, the minimum frequency when the transmitting antenna is at F, and an unmodulated frequency when the transmitting antenna is at points A and B. Thus by comparing the phase of the received wave when the receiver is at point D with that of the wave received at point X, an indication of the angle θ is obtained.

In addition, the maximum percentage of frequency modulation, or modulation index, is produced when the receiving antenna is in the same plane as that of the revolving antenna. When the receiving antenna is moved vertically to point G in FIGURE 1, which is at elevational angle φ with the plane of the transmitting antenna, the magnitude of the doppler frequency shift is reduced according to the cos φ. The over-all doppler shift relation gives the doppler frequency shift $F_d$ as $$F_d = \frac{\omega_r R}{\lambda_c} \sin(\omega_r t + \theta) \cos \phi + \frac{v_t}{\lambda_c}$$

where $\omega_r$ is the angular velocity of the revolving antenna, $\lambda_c$ is the wavelength of the carrier signal, R is the radius of rotation, and $v_t$ is the relative velocity between the transmitter and the receiver. The $$\frac{v_t}{\lambda_c}$$

component is due to any pure linear velocity (closure rate) between the transmitter and the receiver and is a slowly varying component.

Since the above-described phenomena holds equally well for both transmitted and received signals, the same effect would result if the transmitter was located at point G and the receiver connected to the revolving antenna.

Figure 2:
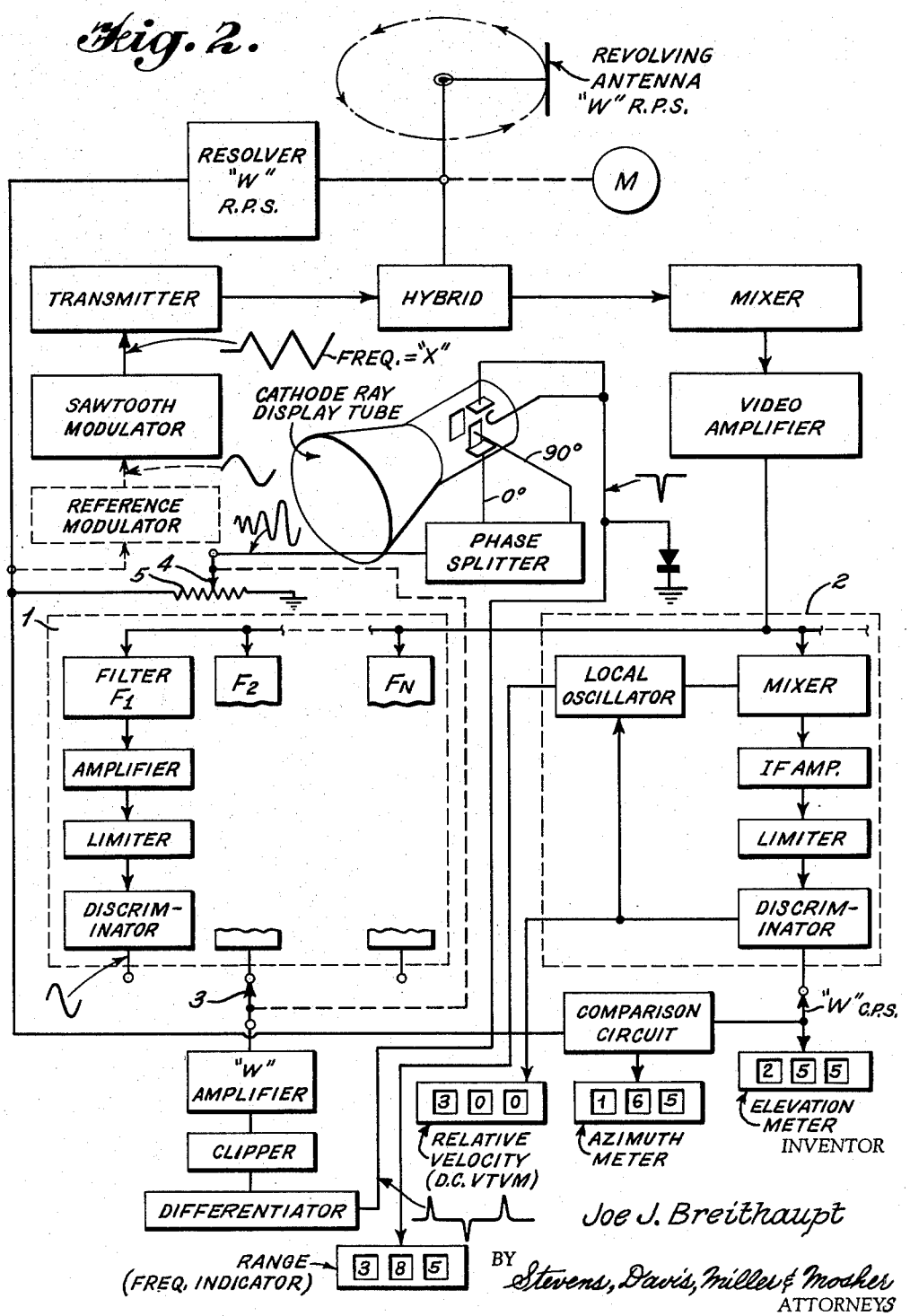
FIGURE 2 is a block diagram of a radar transmitting and receiving system constructed according to the principles of the invention.

A practical radar transmitting and receiving system constructed according to the above principles is shown in block diagram form in FIGURE 2. In order to determine range, the transmitter carrier signal is frequency modulated by a sawtooth voltage of frequency X, with a period equal to approximately four times the maximum radar ranging time. The frequency modulated signal is coupled through a circulator, or hybrid, to the revolving antenna. The leakage through the hybrid is used to furnish a local oscillator signal for the mixer. The FM signal is radiated by the antenna, and after hitting a target, is reflected back and is received by the revolving antenna. The reflected signal is directed to the mixer where a signal having a frequency equal to the difference in frequency between the received signal and the radiated signal is obtained. When the radiated and received frequencies are compared, the difference frequency is an indication of the travel time to the target and back, hence the distance, or range, to the target. This results in a carrier frequency for each target, the higher the frequency the greater the range. The signal from the mixer is sent to a video amplifier having the bandwidth required for passing frequencies at maximum range. The signal or signals are then applied to frequency sensitive voltmeters designated generally by the numeral 1.

The frequency sensitive voltmeters 1 consist of a series of fixed frequency detectors. A bandpass filter in each detector having different center frequencies ($F_1$, $F_2$ . . . $F_N$) determines the frequency of operation. The number of detectors and their bandwidths determine the range resolution capability. Each detector has a discriminator for demodulating the frequency modulation present in the received signal or signals.

A tunable detector is shown generally by the numeral 2 and is essentially a superheterodyne FM receiver consisting of a local oscillator, mixer, IF amplifier, limiter and discriminator. The output of the discriminator is used for Automatic Frequency Control purposes to track return signals from moving targets in addition to supplying a signal for the indicators. A conventional AFC circuit having a relatively long time constant may be used. However, manual tuning of the receiver is possible in order to select desired targets.

The range of the target is a function of the frequency that the discriminator is examining and is read out by a counter, being proportional to the local oscillator frequency. Range may also be read out mechanically as a dial reading for a frequency determining device.

The radial relative velocity is determined by measuring the error voltage in the Automatic Frequency Control servo loop used for tracking the moving target. A D.C. vacuum tube voltmeter is used for the velocity indication.

Azimuthal and elevation determination will now be discussed. The antenna is driven by a motor which is rotating at a speed of W r.p.s. A resolver is coupled to the antenna to establish a voltage of the same frequency as that of the revolving antenna in order to provide a signal for phase comparison with the demodulated FM doppler signal. As was mentioned above, the radiated signal undergoes doppler modulation due to the motion of the antenna. It should be mentioned that in the system illustrated here, the reflected signal from the target also encounters doppler in the receiving process so that the doppler effect in this system is twice that of a one-way system. The received signal passes through the hybrid, mixer, video amplifier, and the tunable detector as was mentioned previously. In the discriminator the doppler modulated signal is demodulated to produce a W c.p.s. signal, the phase of which is proportional to the azimuthal angle θ of the target. The discriminator output and the signal from the resolver are fed into a phase comparison circuit to produce an azimuth indication. This may be accomplished by clipping, differentiating and starting a counter with a pulse from the reference W channel and turning the counter off with the W signal differentiated pulse from the discriminator. The count or digital read out is proportional to bearing angle θ.

The amplitude of the demodulated signal is proportional to the magnitude of the doppler effect which varies as the cosine of the elevational angle φ, and this amplitude is measured to give an indication of the target elevation φ. This information is read out on a suitable A.C. vacuum tube voltmeter, illustrated in FIGURE 2 as a digital read out. Thus from the basic radar system it is possible to read range to the target and derive relative velocity of the target, bearing of the target and target elevation.

The outputs from the discriminators in the frequency sensitive voltmeters 1 are coupled to a range selector switch 3. The output of the switch then passes through a W bandpass amplifier, clipper and a differentiator. The differentiator produces output pulses which represent the phase of the doppler produced signal. When the phase of the doppler produced signal is compared with the phase of the W reference signal from the resolver a bearing indication is obtained. In FIGURE 2 the reference signal W is applied to a cathode ray oscilloscope through a phase splitter in order to obtain a circular sweep. The differentiated signal from range selector switch 3 is applied to the oscilloscope to modulate the beam intensity. This produces a spot at some point on the circular sweep that is representative of the phase difference which is bearing angle θ.

Elevational angle above the plane of rotation of the antenna is determined by the amplitude of the output signal from the discriminator. Since the frequency is constant, the slope of the clipped signal applied to the differentiator is proportional to the amplitude of the original unclipped signal. The amplitude of the differentiated signal is a function of the slope; hence it is proportional to the elevational angle φ. The differentiated signal is fed to the vertical deflection circuit of the oscilloscope to deflect the trace "downward" at the same time the spot is being brightened. The result is a line originating at the bearing position extending downward and having a length proportional to the elevational angle.

Range is exhibited by switching the switch 3 from one detector to the other, either manually or by motor or electronic means. As the switch position is changed, the tap 4 on the range attenuating resistor 5 is caused to apply a signal to the phase splitter of sufficient amplitude to obtain a circular sweep size proportional to the range selected.

Figure 3:
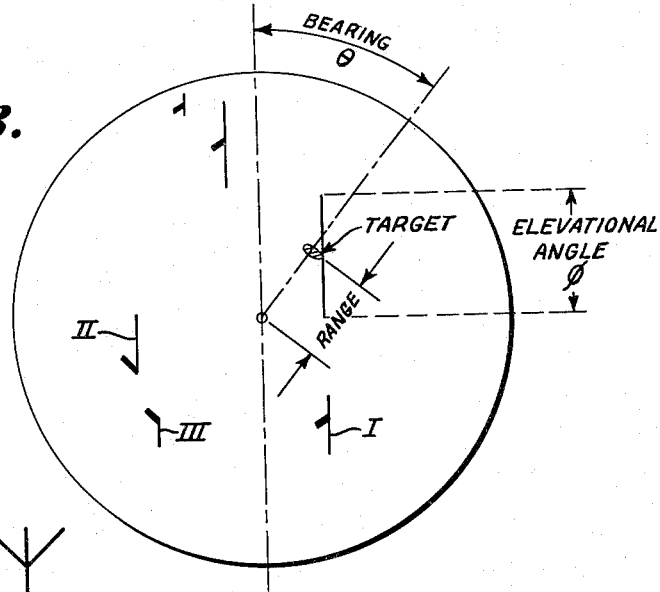
FIGURE 3 shows how the radar display picture of this invention is presented on the screen of a cathode ray tube.

The cathode ray tube picture used is illustrated in more detail in FIGURE 3. The display on the tube screen is made up of spots representative of bearing and range of the targets and vertical lines passing through the spots, the lengths of which indicate the target elevational angles. The distance from the center of the screen to a spot is indicative of the range of the corresponding target, while the angular position of the spot indicates the bearing. If the radar is located on a ground plane, elevation can be measured only above the ground plane, and the elevational angle information is displayed by means of a vertical line passing through the spot and projecting both above and below the spot. This is illustrated by line I in FIGURE 3. On the other hand, if the radar is located in an aircraft, with the capability of the elevational angle being either plus or minus, the angle is displayed as a line starting from the radar spot and projecting either upward or downward from the spot. As is shown in FIGURE 3, line II corresponds to a positive elevational angle and line III to a negative elevational angle.

Another version of the doppler radar is possible and is especially useful when tracking a target having appreciable relative velocity. Here, the transmitted frequency is held constant, and the difference frequency sent to the selective filters and tunable detector is produced by the radial relative velocity of the target. Bearing and elevational information is still obtained by demodulating the FM signal caused by the antenna rotation and processing the signal in the frequency sensitive voltmeters or tunable detector as described above.

It should also be pointed out that it is not necessary to physically revolve the radiating or receiving antenna in order to produce the desired doppler effect. As is shown in FIGURE 10 the effect can be obtained by locating an array of individual antenna elements in a circle and successively energizing the individual antenna elements so as to produce the equivalent of a physically revolving antenna.

If the system is to operate as a beacon, with the receiving apparatus being located in the aircraft, a slight modification must be made. The output of the reference resolver is coupled to a W cycle reference modulator for causing the sawtooth sweep signal to be frequency modulated before the sawtooth signal modulates the radar carrier. This is shown by the dashed lines of FIGURE 2.

Figure 4:
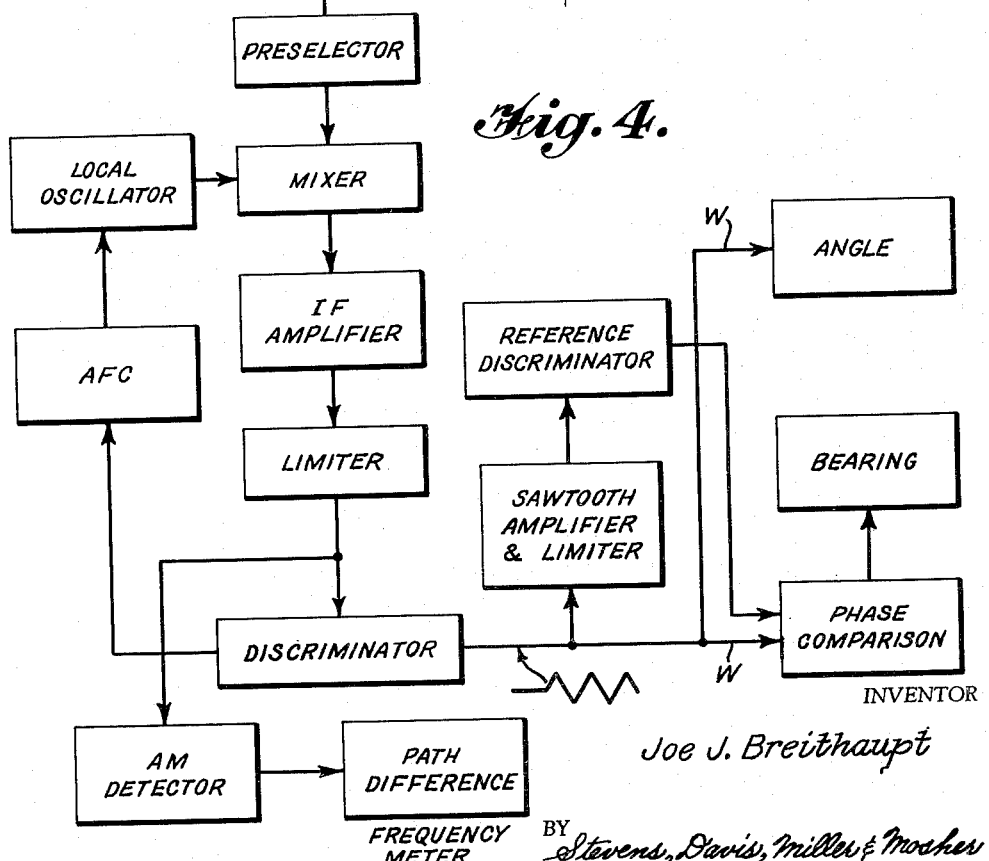
FIGURE 4 is a block diagram of a radio receiving system for signals produced by a transmitter employing the principles of the present invention for use in an aircraft not equipped with a transmitter.

A block diagram of a remote receiving system such as would be located in an aircraft is given in FIGURE 4. In the remote receiver the received signal is passed through a discriminator where two signals are removed in the demodulation process. One is the W cycle frequency modulation provided by the doppler effect and the other is the sawtooth sweep signal with its reference W cycle frequency modulation. The receiver consists essentially of a preselector, mixer, local oscillator, IF amplifier (of relatively narrow bandwidth), limiter, discriminator, and Automatic Frequency Control. After passing through the preselector, mixer, IF amplifier, and limiter, the incoming radar signal is demodulated in the discriminator to produce the W cycle signal resulting from the antenna doppler effect and the sawtooth sweep signal modulated with the reference signal. The sawtooth sweep signal, after being sent through an amplifier and limiter, is applied to a reference discriminator where the W cycle reference signal is removed. The W cycle reference and the demodulated W cycle antenna doppler-produced signal are sent to the phase comparison circuit to obtain an azimuth indication. As in the previously described system, the amplitude of the antenna doppler-produced W cycle demodulated signal is an indication of the elevational angle of the aircraft.

If there is a multipath as in the case of one aircraft transmitting directly to another aircraft and a ground return, the difference in frequency may be determined. The two incoming FM signals are delayed by their respective path lengths which produce a beat frequency in an AM detector. The beat frequency is exhibited on a frequency meter for path difference determination. By knowing the altitude of the aircraft above the reflection point it is possible to determine the range between these two targets.

Figure 5:
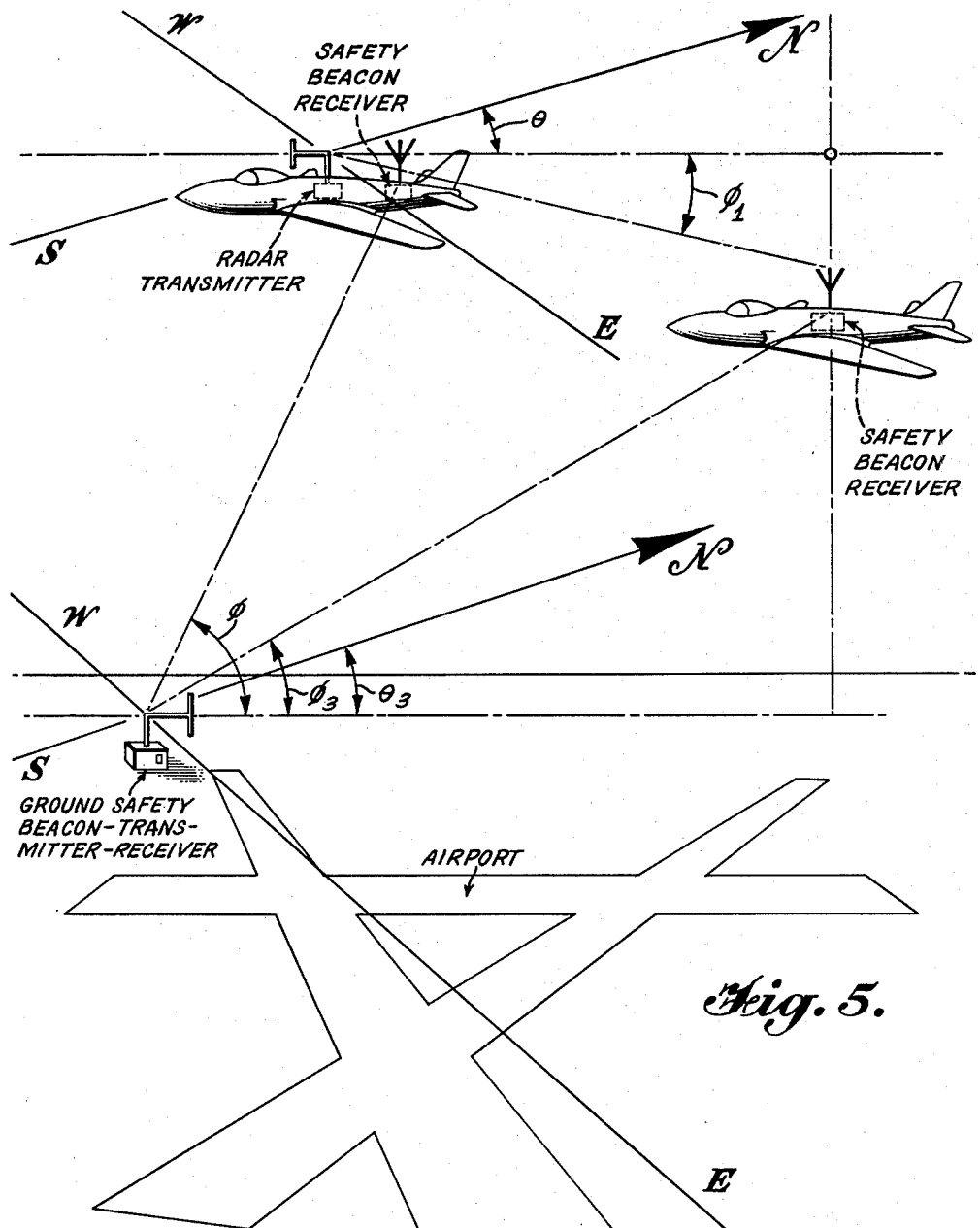
FIGURE 5 illustrates how the dopper radar system of this invention may be used by two moving aircraft.

FIGURE 5 illustrates a radar set-up in which a ground beacon at an airport radiates to aircraft A and B. Aircraft A is equipped with both a safety beacon receiver as well as a transmitting radar system with revolving antenna, while aircraft B is equipped with a safety beacon receiver only. The safety receiver in aircraft B can determine its bearing angle $\theta_3$ and its elevational angle $\phi_3$ from information provided by the ground beacon. Similarly, aircraft A can determine its elevational angle $\phi$ and its bearing angle $\theta$ (which in this case was made zero for simplicity) from the ground beacon signal. At the same time, of course, the ground station can measure the bearing, angle, and range of both aircraft.

In aircraft A, a radar beacon is also in operation, and this radar is also measuring the bearing angle $\theta$ and the elevational angle $\phi_1$ of the aircraft B with respect to aircraft A. The range between the aircraft as well as their relative velocity is also being determined by aircraft A's radar system. The radar in aircraft A would be on a time sharing basis with the radar from the ground beacon, e.g. the radar in aircraft A might transmit for one second and be off for five seconds in cases where the targets do not require immediate action. Longer transmitting times may be obtained where immediate action is required. Also, the radar in aircraft A can measure the bearing $\theta$ and angle $\phi_2$ of aircraft A with respect to the ground. This information can serve as a check on the information obtained from the safety beacon receiver in the aircraft ($\phi_2 = 90° - \phi$ here).

Figure 6:
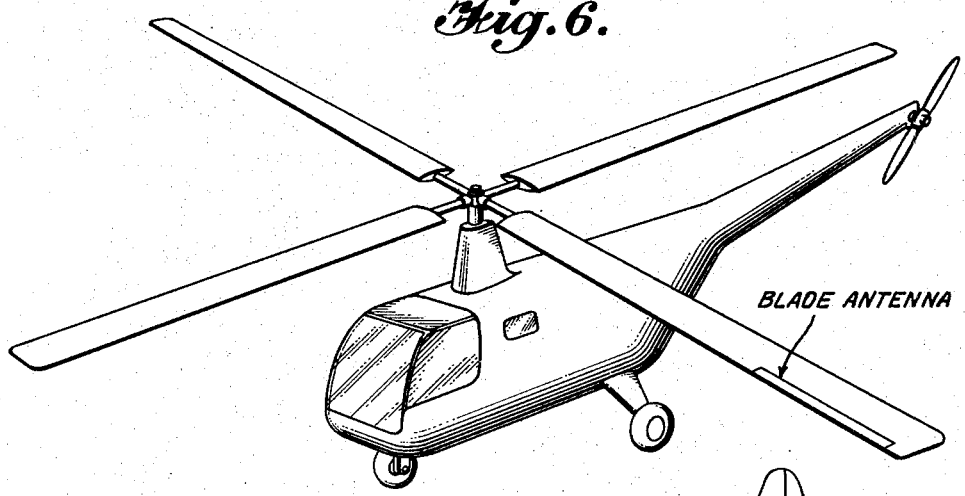
FIGURE 6 illustrates how the revolving antenna is used in connection with a helicopter propeller.
Figure 7:
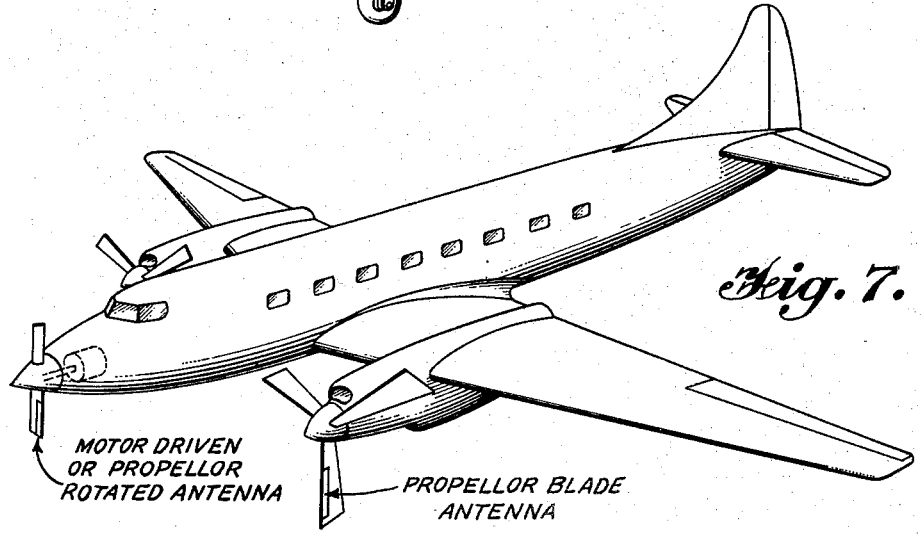
FIGURE 7 illustrates how the revolving antenna is attached to the propeller of a conventional propeller-driven aircraft.

As is shown in FIGURES 6 and 7, a doppler direction finder or a radar system based on the principles of the present invention can be constructed by using a helicopter propeller blade as the revolving antenna (FIGURE 6) with the transmitter and/or receiver inside the helicopter. This would involve either fastening a suitable antenna to the blade or using the blade itself for the antenna element. Also, one of the propeller blades of a conventional aircraft may be used as the revolving antenna (FIGURE 7). These systems would be primarily used for navigation and instrument landings.

Figure 8:
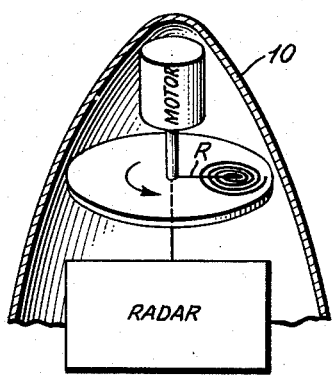
FIGURE 8 shows how the revolving antenna is located in the nose cone of a missile in a doppler missile guidance system.

FIGURE 8 shows how the doppler system may be located inside the nose cone 10 of a missile. A spiral antenna 11 is mounted on a revolvable disk 12 at a radius R from the center of a disk. The disk is revolved by a motor at a speed of W r.p.s. The antenna is connected to a radar signal processing system which may either be active, and include a frequency modulated transmitter; or be passive, with the missile being made to home on radar communications from outside.

The principles of the present invention apply to acoustical energy as well as to electromagnetic energy. Application of these principles to anti-submarine warfare, as well as to geophysical exploration, is illustrated in FIGURE 9. A sonar transmitter feeds an electric-acoustic transducer 20 which is located under water and is revolved in a plane at constant velocity. An acoustic signal is sent out which is modulated due to the doppler effect to provide information as to the bearing $\theta$ and depth angle $\phi$ of a sound reflecting body 21. The return signal is picked up by the revolving transducer 20 and is sent to a receiver. The received signal is processed in phase measuring circuits to determine the bearing angle $\theta$ and the depth angle $\phi$ of the body 21. A practical transducer revolving speed is 3 r.p.s.; such speed obtaining a doppler shift of 100 c.p.s. for a 10 kc. radiation signal. Range is determined by radiating a pulsed or frequency modulated signal from a stationary electric-acoustic transducer 22 and sending the return signal through appropriate time measuring circuitry.

Although the invention has been shown and described with reference to particular embodiments, nevertheless various changes and modifications obvious to those skilled in the art are deemed to be within the spirit, scope and contemplation of the invention.

What is claimed is:

1. A direction finding system comprising an antenna for radiating signals into space and for receiving some of the radiated signals which have been reflected by an object in space, means for revolving said antenna in a plane at such constant angular velocity that the radiated signal undergoes significant frequency modulation due to the doppler effect between the moving antenna and the object in space, means for impressing an outgoing signal on said antenna, and means for demodulating the doppler-produced frequency modulated signal received by said antenna from said object in space, means for detecting the amplitude of the demodulated signal to find the elevational angle of said object in space and the phase of said demodulated signal to find the azimuthal angle of said object in space.

2. An object direction finding system comprising signal transmitting means and receiving means, said means establishing a signal path, means for cyclically varying the signal travel distance over said path to produce a doppler modulated received signal, means for demodulating said received signal to produce a demodulated signal whose phase and amplitude are respectively proportional to object bearing and elevation with respect to one of said transmitting means and receiving means remote from said object, and means for detecting the phase and amplitude of said demodulated signal.

3. The system of claim 2, wherein said signal transmitting means and receiving means include a common antenna.

4. The system of claim 2, wherein said signal transmitting and receiving means include respective physically spaced antennas.

5. The system of claim 2, wherein said means for cyclically varying the signal travel distance over said path comprises means for revolving said signal transmitting means in a circular path to produce said doppler modulated received signal.

6. The system of claim 2, wherein one of said signal transmitting means and receiving means includes an antenna mounted on a propeller of a propeller-driven vehicle.

7. The system of claim 4 wherein said signal transmitting means includes means for transmitting a reference signal, and means coupled to said receiving means for producing and coupling said reference signal to said means for detecting the phase and amplitude of said demodulated signal.

8. The system of claim 2, wherein said receiving means includes means for mixing the transmitted and received signals to produce a beat carrier whose frequency is proportional to object range and means for detecting said frequency.

9. The system of claim 8, including means for detecting said frequency rate of change for determining object velocity.

10. The system of claim 2, wherein said means for demodulating said received signal comprises a plurality of demodulator means each having a bandpass centered at a different frequency and including selector means for coupling said demodulator means to said means for detecting the phase and amplitude of demodulated signal.

11. The system of claim 10, wherein said means for detecting the phase and amplitude of said demodulated signal comprises cathode ray display means having horizontal and vertical deflection and beam intensity control means, means coupling said means for cyclically varying the signal travel distance over said path to said horizontal and vertical deflection means for producing a circular trace on said display means, and clipping and differentiating means coupling said demodulated signal to said vertical deflection and beam intensity control means.

12. The system of claim 2, wherein said means for demodulating said received signal comprises a mixer, local oscillator, means coupling said mixer to said local oscillator and said received signal for producing a doppler modulated intermediate frequency signal, discriminator means for demodulating said doppler modulated intermediate frequency signal, and automatic frequency control means coupled to said discriminator means and said local oscillator for maintaining said intermediate frequency constant, and including means for detecting said local oscillator frequency for determining object range.

13. The system of claim 12, including means for detecting said local oscillator frequency rate of change for determining object velocity.

14. An object direction finding system comprising signal transmitting means and receiving means, said means establishing a signal path, means for cyclically varying the signal travel distance over said path to produce a doppler modulated received signal having a carrier frequency, means for demodulating said received signal to produce a demodulated signal whose phase is proportional to object bearing with respect to one of said transmitting means and receiving means remote from said object, means for detecting the phase of said demodulated signal, means for mixing said carrier frequency with the transmitted signal frequency to produce a beat carrier signal and means for detecting the frequency of said beat carrier signal and its rate of change for determining object range and velocity.

15. The system of claim 14, including means for detecting the amplitude of said demodulated signal for determining object elevation.

16. An object direction finding system comprising signal transmitting means and receiving means, said means establishing a signal path, means for cyclically varying the signal travel distance over said path to produce a doppler modulated received signal having a carrier frequency, means for determining object bearing and elevation from said doppler modulated received signal, and means for determining object range and velocity from said carrier frequency.

17. An object direction finding system comprising means for radiating a signal from a source, means for receiving said signal, means for moving said source in a circular path to doppler modulate the received signal, means for demodulating said received signal to produce a demodulated signal whose phase and amplitude are respectively proportional to object bearing and elevation with respect to one of said means for radiating and means for receiving remote from said object, and means for detecting the phase and amplitude of said demodulated signal.

References Cited in the file of this patent

UNITED STATES PATENTS

| | | |
|---|---|---|
| 2,412,702 | Wolff | Dec. 17, 1946 |
| 2,425,383 | Luck | Aug. 12, 1947 |
| 2,602,920 | Rust | July 8, 1952 |
| 2,666,199 | Rothschild | Jan. 12, 1954 |